United States Patent
Galiano et al.

(10) Patent No.: US 9,657,124 B2
(45) Date of Patent: May 23, 2017

(54) HALOGEN COPOLYMERS COMPRISING AT LEAST ONE REPETITIVE VINYL ETHER UNIT HAVING ONE CARBONATE PENDANT GROUP

(75) Inventors: Hervé Galiano, La Ville aux Dames (FR); Bruno Ameduri, Montpellier (FR); Bernard Boutevin, Montpellier (FR); Ali Alaaeddine, Beyrouth (LB)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 831 days.

(21) Appl. No.: 13/878,578

(22) PCT Filed: Oct. 6, 2011

(86) PCT No.: PCT/EP2011/067495
§ 371 (c)(1),
(2), (4) Date: Jun. 28, 2013

(87) PCT Pub. No.: WO2012/049070
PCT Pub. Date: Apr. 19, 2012

(65) Prior Publication Data
US 2013/0280620 A1    Oct. 24, 2013

(30) Foreign Application Priority Data
Oct. 11, 2010 (FR) ..................... 10 58230

(51) Int. Cl.
| | | |
|---|---|---|
| H01M 10/0565 | (2010.01) | |
| H01M 10/0525 | (2010.01) | |
| C08F 224/00 | (2006.01) | |
| C08F 214/18 | (2006.01) | |
| H01M 10/052 | (2010.01) | |
| C08F 216/14 | (2006.01) | |

(52) U.S. Cl.
CPC .......... *C08F 224/00* (2013.01); *C08F 214/18* (2013.01); *C08F 214/186* (2013.01); *C08F 216/1416* (2013.01); *H01M 10/052* (2013.01); *H01M 10/0565* (2013.01); *H01M 2220/20* (2013.01); *H01M 2300/0082* (2013.01); *Y02E 60/122* (2013.01)

(58) Field of Classification Search
USPC .......................................... 429/316; 526/247
See application file for complete search history.

(56) References Cited

U.S. PATENT DOCUMENTS

| | | | |
|---|---|---|---|
| 5,798,417 A | 8/1998 | Howard, Jr. | |
| 8,691,928 B2* | 4/2014 | Hsieh ..................... | C08G 77/46 528/31 |
| 2002/0168575 A1* | 11/2002 | Smith ................ | C08G 64/0208 429/317 |
| 2004/0097677 A1* | 5/2004 | Boutevin .............. | C08F 234/02 526/249 |
| 2004/0248014 A1* | 12/2004 | West ...................... | H01G 11/64 429/313 |
| 2005/0170254 A1* | 8/2005 | West ................... | H01M 10/052 429/313 |
| 2006/0035154 A1* | 2/2006 | West .................... | C08G 77/045 429/313 |
| 2011/0151333 A1* | 6/2011 | Halalay ............... | H01M 2/1653 429/249 |
| 2011/0318648 A1* | 12/2011 | Eitouni ................ | C08G 81/025 429/313 |
| 2011/0318649 A1* | 12/2011 | Eitouni ................ | C08G 65/336 429/313 |
| 2012/0136077 A1 | 5/2012 | Soules et al. | |
| 2012/0219878 A1 | 8/2012 | Tayouo et al. | |
| 2013/0150544 A1 | 6/2013 | Galiano et al. | |
| 2016/0359199 A1* | 12/2016 | Galiano ................ | H01M 4/525 |

OTHER PUBLICATIONS

Unpublished U.S. Appl. No. 13/823,991, filed Mar. 15, 2013.

* cited by examiner

*Primary Examiner* — Mark Kaucher
*Assistant Examiner* — Henry Hu
(74) *Attorney, Agent, or Firm* — Hultquist, PLLC; Mary B. Grant

(57) ABSTRACT

This invention concerns copolymers that may be used for incorporation into electrolytic membranes for lithium generators, comprising at least one vinyl ether repetitive unit comprising a pendant cyclic carbonate group.

15 Claims, No Drawings

HALOGEN COPOLYMERS COMPRISING AT LEAST ONE REPETITIVE VINYL ETHER UNIT HAVING ONE CARBONATE PENDANT GROUP

CROSS-REFERENCE TO RELATED APPLICATIONS

This application is a U.S. national phase under the provisions of 35 U.S.C. §371 of International Patent Application No. PCT/EP11/67495 filed Oct. 6, 2011, which in turn claims priority of French Patent Application No. 1058230 filed Oct. 11, 2010. The disclosures of such international patent application and French priority patent application are hereby incorporated herein by reference in their respective entireties, for all purposes.

FIELD

This invention concerns original halogen copolymers comprising, inter alia, at least one specific repetitive unit comprising at least one pendant carbonate group as a repetitive unit.

These copolymers have good ionic conduction properties, in particular with regard to lithium ions, and good physical properties, in terms of thermal stability, the ability to be put into the form of a film, chemical inertia, and/or electrochemical stability.

Naturally, such copolymers can be integrated into ion-conducting membranes, in particular, for lithium ions, and can, in particular, be incorporated into lithium generators.

Thus, these copolymers can be applied in the field of portable equipment using lithium generators for their operation, which is the case, in particular camcorders, computers, or mobile telephones.

PRIOR ART

Electrochemical lithium generators operate on the principle of the simultaneous insertion/deinsertion (or intercalation/deintercalation) of lithium within the positive and negative electrodes.

More specifically, the electrochemical reaction at the origin of the power generation involves the transfer, via an lithium ion-conducting electrolyte, of lithium cations from a negative electrode that is intercalated into the positive electrode's acceptor network, with the lithium ions passing through a lithium ion-conducting electrolyte.

Generally, the negative electrode is based on a carbonaceous material such as graphite, and is the site of an intercalation reaction of the lithium in the charging process.

The positive electrode, for its part, is classically based on a lithium transition metal oxide (whereby the metal may be, e.g., cobalt, nickel, manganese), and is the site of a deintercalation of the lithium in the charging process.

A separator ensures the physical separation between the negative and positive electrodes. Classically, it includes a microporous film, e.g., of polyolefin, such as polyethylene, polypropylene, having a thickness that may range between 20 and 25 μm, which microporous film is impregnated with a liquid electrolyte.

The liquid electrolyte must ensure the conduction of the lithium ions from the positive electrode to the negative electrode during the charging process, and vice versa, during the discharging process (i.e., during operation). This electrolyte is classically in the form of a lithium salt dissolved in an organic solvent, generally from the carbonate family.

This type of electrolyte is highly sensitive to water. The accumulators comprising them must thus be assembled under drastic conditions, with strict control of ambient humidity, which classically takes place in clean rooms.

Moreover, organic solvent-based electrolytes have very limited conductivity (on the order of $10^{-2}$ S/cm), and necessitates, as a result, the use as a support of very fine microporous films in order to limit the electrolytic resistance of the accumulator, which is proportional to the product of the thickness of the film and the inverse of the conductivity.

Thus, the lithium accumulators operating with an organic solvent-based electrolyte have relatively limited-power performance.

In order to address these disadvantages related to the use of liquid electrolytes, one solution may consist of using solid electrolytes that are intrinsically good lithium ion conductors, which allow for conductivity of these ions at elevated temperatures.

Thus, the inventors developed new copolymers with all of the characteristics necessary to form solid lithium ion-conducting electrolytes, i.e., good conductivity of lithium ions, as well as chemical and physical inertia (in particular good thermal stability).

DESCRIPTION OF THE INVENTION

Thus, the invention concerns copolymers comprising at least one repetitive unit having the following formula (I):

in which:
$R^1$, $R^2$, $R^3$, and $R^4$ represent, independently of one another, a hydrogen atom, a halogen atom, a perflouoroalkyl group or a perfluoroalkoxy group, provided that at least one of the $R^1$-$R^4$ groups represents a halogen atom, a perfluoroalkyl group, or a perfluoroalkoxy group,
and comprising at least one repetitive unit having the following formula (II):

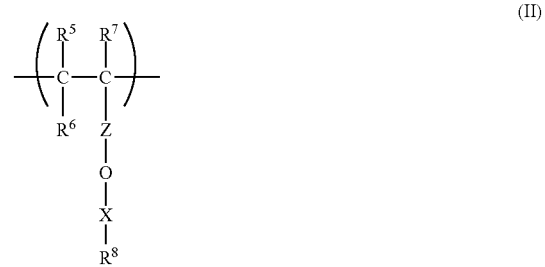

in which:
$R^5$, $R^6$, $R^7$ represent, independently of one another, a hydrogen atom, an alkyl group;
Z is a single bond or an alkylene group;
X is an alkylene group or a perfluoroalkylene group; and
$R^8$ is a cyclic carbonate group.

Before going into detail in the description, the following definitions are specified.

"Alkyl group" refers classically above and in the following to a linear or branched alkyl group having the formula —$C_nH_{2n+1}$, where n corresponds to the number of carbon atoms, which may be 1 to 5, whereby such a group may be a methyl group.

"Perfluoroalkyl group" refers classically above and in the following to an alkyl group in which all hydrogen atoms are replaced with fluorine atoms, corresponding to the formula —$C_nF_{2n+1}$, where n corresponds to the number of carbon atoms, which may be 1 to 5, whereby such a group may be a group having the formula —$CF_3$.

"Perfluoroalkoxy group" refers classically above and in the following to a —O-alkyl group in which all hydrogen atoms are replaced with fluorine atoms, corresponding to the formula —O—$C_nF_{2n+1}$, where n corresponds to the number of carbon atoms, which may be 1 to 5, whereby such a group may be a group having the formula —O—$CF_3$.

It should be noted that "alkylene group" refers classically to an alkyl group forming a bridge between two other groups, i.e., in which two hydrogen atoms are substituted to form the bridge, whereby an example of an alkylene group may be a methylene group having the formula —$CH_2$— or an ethylene group having the formula —$CH_2$—$CH_2$—.

A single bond refers to the fact that the carbon atom with the $R^7$ group is directly bonded to the aforementioned oxygen atom of formula (II) above.

"Perfluoroalkylene group" refers classically above and in the following to an alkylene group as defined above, in which all hydrogen atoms are replaced by fluorine atoms; an example of a perfluoroalkylene group may be a perfluoroethylene group having the formula —$CF_2$—$CF_2$—.

"Cyclic carbonate group" refers to a carbonate group comprising a —O—CO—O— unit in a cycle; an example of a cyclic carbonate group may be a group corresponding to one of the following formulae (III) or (IV):

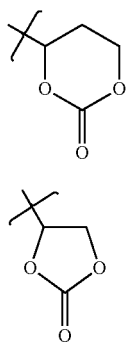

with the bracket indicating the site on which the above groups are bonded to the group X of the formula (II) above.

Due to the simultaneous presence in the copolymers of at least one repetitive unit having the formula (I) and at least one repetitive unit having the formula (II), the copolymers of the invention have good thermal resistance, in particular in a wide range of temperatures (e.g., a temperature range of −25 to 150° C.), good chemical inertia, and good stability at high and low potential (in particular for a wide range of electrochemical potentials, such as an electrochemical window of −3 to +5 V), good ability to be put in film form, whilst having lithium ion-conducting properties due, in particular, to the presence of the pendant cyclic carbonate groups; thus, these copolymers meet the specifications for the solid electrolytes intended to be incorporated into lithium generators.

According to the invention, according to a specific embodiment, concerning the repetitive unit of formula (I), at least two of the groups $R^1$-$R^4$ may advantageously represent fluorine atoms.

According to a particular embodiment of the invention, $R^1$ to $R^4$ may represent a fluorine atom, in which case the repetitive unit is a unit from the polymerisation of tetrafluoroethylene.

According to another embodiment, three of the $R^1$-$R^4$ may represent a fluorine atom, whilst the fourth group may represent a hydrogen atom, a halogen atom other than fluorine, a perfluoroalkyl group, or a perfluoroalkoxy group.

Thus, for example, $R^1$-$R^3$ may represent a fluorine atom, and $R^4$ may represent a hydrogen atom, a chlorine atom, a perfluoromethyl group, a perfluoromethoxy group, a perfluoroethoxy group, or a perfluoropropoxy group; such an unit corresponds to formula (V) below:

in which $R^4$ represents a hydrogen atom, a chlorine atom, a perfluoromethyl atom, a perfluoromethoxy atom, a perfluoroethoxy atom, or a perfluoropropoxy group.

According to yet another embodiment, two of the $R^1$-$R^4$ groups (e.g., $R^1$ and $R^3$) may represent a fluorine atom, a group (e.g., $R^2$) may represent a hydrogen atom, whilst the last group (e.g., $R^4$) may represent a hydrogen atom, a chlorine atom, a perfluoromethyl group, a perfluoromethoxy group, a perfluoroethoxy group, or a perfluoropropoxy group.

According to a particular embodiment of the invention, concerning the repetitive unit of formula (II), Z is a single bond, in which the unit corresponds to formula (VI) below:

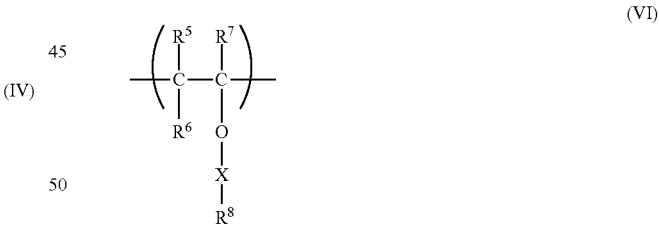

in which $R^5$, $R^6$, $R^7$, $R^8$, and X are as defined above.

In particular, $R^5$-$R^7$ may represent a hydrogen atom, and X an alkylene group, such as a —$CH_2$— group.

A repetitive unit corresponding to the definition above may correspond to formula (VII) below:

where $R^8$ may correspond to a cyclic carbonate group, such as a group of the formulae (III) or (IV) defined above, and, in particular, a group of formula (IV), in which case the unit may correspond to one of formulae (VIII) or (IX) below:

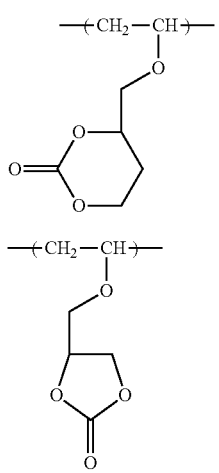

Thus, a particular copolymer according to the invention is a copolymer comprising, as a particular repetitive unit of formula (I), at least one repetitive unit having formula (V) below:

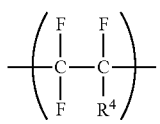

in which $R^4$ represents a chlorine atom, a perfluoromethyl group, or a perfluoromethoxy group, and at least one repetitive unit of formula (IX) below as a particular repetitive unit of formula (II):

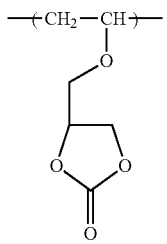

The copolymers of the invention may comprise 40-95 mol. % of the repetitive unit of formula (I) and 5-60 mol. % of the repetitive unit of formula (II).

The molar mass of the copolymers of the invention may range from 800-50,000 g·mol$^{-1}$.

The copolymers of the invention may be alternating copolymers, i.e., with alternation in the skeleton of at least one repetitive unit of formula (I) and at least one unit of formula (II).

In this case, the copolymer will classically include 50 mol. % of the repetitive unit of formula (I) and 50 mol. % of the repetitive unit of formula (II).

The copolymers of the invention may be obtained by a method of polymerisation, in particular a radical polymerisation method comprising a step of polymerisation in the presence of a free radical initiator and at least one monomer of formula (X) below:

and at least one monomer of formula (XI) below:

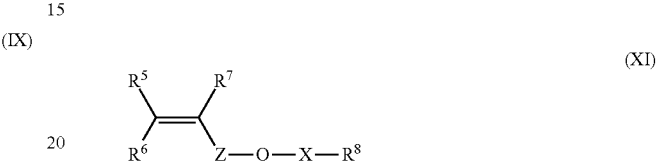

in which $R^1$, $R^2$, $R^3$, $R^4$, $R^5$, $R^6$, $R^7$, $R^8$, X, and Z are as defined above.

An effective free radical initiator in the context of this method may be chosen from the peroxypivalate derivatives such as tert-butyl peroxypivalate (TBPPi) or tert-amyl peroxypivalate, peroxide derivatives such as ditertbutyl or benzoyl peroxide, sulphate derivatives such as persulphate derivatives such as sodium or ammonium persulphate.

In particular, a particularly suited free radical initiator for the implementation of this method may be a peroxypivalate derivative such as tert-butyl peroxypivalate.

The polymerisation step is carried out preferably in an aprotic polar solvent, which may be chosen from the following solvents:
  dimethylformamide (DMF);
  acetonitrile;
  a halogenated solvent such as 1,1,2-trifluoro-1,2,2-trichloroethane, 1,1,1,3,3-pentafluorobutane, pentafluorohexane, pentafluoroheptane, perfluorobenzene, perfluoro-1-butyltetrahydrofurane;
  tetrahydrofurane;
  water, and
  mixtures of the above.

If the monomers used are in gaseous form (as in particular in the case of the monomer chlorotrifluoroethylene) and the reaction occurs under pressure, it may be carried out in an autoclave.

For the monomers of formula (X), at least two of the groups $R^1$-$R^4$ may advantageously represent fluorine atoms.

In particular, $R^1$-$R^4$ may represent fluorine atoms, in which case the monomer is tetrafluoroethylene.

Even more specifically, three of the $R^1$-$R^4$ may represent a fluorine atom, whilst the fourth group may represent a hydrogen atom, a halogen atom other than fluorine, a perfluoroalkyl group, or a perfluoroalkoxy group.

Monomers consistent with this specificity may be those corresponding to formula (XII) below:

in which W represents an atom of hydrogen, Cl, —CF$_3$, —OCF$_3$, —O—CF$_2$—CF$_3$, or —O—CF$_2$—CF$_2$—CF$_3$; thus, these monomers are respectively trifluoroethylene, chlorotrifluoroethylene (CTFE), hexafluoropropene (HFP), perfluoromethylvinylether (PMVE), perfluoroethylvinylether, and perfluoropropylvinylether. These monomers are commercially available.

Concerning the monomers of formula (XI), Z may be a single bond.

In particular, R$^5$-R$^7$ may represent a hydrogen atom, and X an alkylene group, such as a —CH$_2$— group.

Monomers consistent with this specificity may be those corresponding to formula (XII) below:

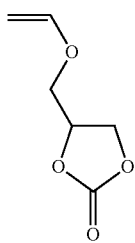

(XII)

The electron acceptor monomers of formula (X) and the electron donor monomers of formula (XI) may classically react together to provide the alternating copolymers.

The monomers of formula (XI) may be prepared by a transetherification step consisting of placing a compound of formula (XIII) below:

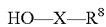

HO—X—R$^8$      (XIII)

in contact with a compound of formula (XIV) below:

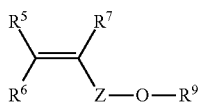

(XIV)

in which R$^5$, R$^6$, R$^7$, R$^8$, and Z are as defined above, and R$^9$ is an alkyl group.

This transetherification step may be carried out in the presence of a palladium-based catalyst such as an acetate catalyst of (1,10-phenanthroline)palladium (II) in a halogenated solvent, such as dichloromethane. It may also be carried out in the presence of a catalyst based on a metal other than palladium (such as cobalt or mercury).

In particular, in preparing a copolymer comprising a repetitive unit of formula (V) below as a repetitive unit:

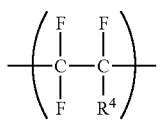

(V)

in which R$^4$ represents a hydrogen atom, a chlorine atom, a perfluoromethyl atom, a perfluoromethoxy group, a perfluoroethoxy group, or a perfluoropropoxy group, and, as a repetitive unit, a repetitive unit having the following formula (IX):

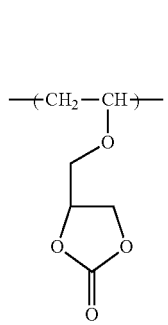

(IX)

the monomers involved in the preparation of this copolymer are monomers corresponding respectively to the following formulae:

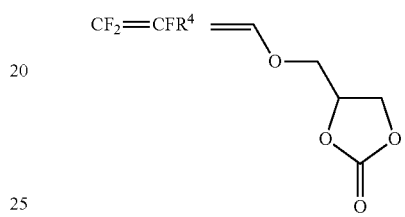

whereby the latter monomer is known to be the vinyl ether of glycerine carbonate (or as (2-oxo-1,3-dioxolan-4-yl) methylvinylether), and R$^4$ is as defined above.

Following the polymerisation step, the method of the invention may comprise a step of isolating the copolymer from the reaction environment, which may consist of adding to the crude reaction environment a precipitation solvent such as cold pentane, followed by filtration of the precipitate obtained.

The copolymers according to the invention have, amongst other properties, good lithium ion conduction.

Thus, quite naturally, they may be incorporated into a lithium ion-conducting electrolyte for lithium generators.

Thus, the invention also concerns a membrane, e.g., an electrolytic membrane, comprising at least a copolymer as described above.

The membranes may be prepared in the classical fashion, e.g., by casting, i.e., the copolymer is dissolved in a suitable solvent such as acetone or methylethylacetone, then applied to a flat surface, e.g., a glass or polytetrafluoroethylene plate, using a device such as a hand applicator.

The copolymer that forms a moist film is then dried to form a film of sufficient thickness, e.g., 15-150 μm, then removed from the substrate.

This invention further concerns a lithium generator comprising at least one electrochemical cell, each of them comprising at least one membrane as defined above, arranged between a positive and negative electrode.

"Positive electrode" classically refers above and in the following to the electrode that serves as a cathode when the generator discharges current (i.e., when it is in discharge), and serves as an anode when the generator is charging.

"Negative electrode" classically refers above and in the following to the electrode that serves as an anode when the generator discharges current (i.e., when it is in discharge), and serves as an cathode when the generator is charging.

Generally, the negative electrode may be based on a carbonaceous material such as graphite, and is the site of an intercalation reaction of the lithium in the charging process.

The positive electrode, for its part, may be based on a lithium transition metal oxide (whereby the metal may be, e.g., cobalt, nickel, manganese), and is the site of a deintercalation of the lithium in the charging process.

The invention will now be described, without limitation, by reference to the following examples.

DETAILED DESCRIPTION OF SPECIFIC EMBODIMENTS

Example 1

This example concerns the preparation of (2-oxo-1,3-dioxolan-4-yl)methylvinylether with the following formula:

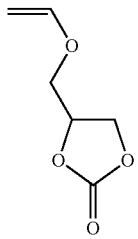

The protocol for the preparation of this compound is as follows.

In a Schlenk tube, palladium acetate (760 mg, 3.38 mmol) is solubilised in dichloromethane (10 mL). A (1,10) phenanthroline solution (916 mg, 5.08 mmol) in dichloromethane (10 mL) is then added to it. The reaction mixture is agitated at room temperature for 30 minutes to generate the palladium catalyst in situ (in this case, (1,10-phenanthroline) palladium (II)). A solution of glycerol carbonate (20 g, 0.169 mol) and ethylvinylether (73.33 g, 1.01 mol) is added to the solution; then, the reaction mixture is inserted into an autoclave. The reaction mixture is then heated to 60° C. for 24 hours. The dichloromethane and ethylvinylether are then evaporated in a vacuum. The product is solubilised in 200 mL dichloromethane and 200 mL water are then added. The reaction mixture is then extracted 3 times with dichloromethane (2*200 mL). The organic phase is dried on $Na_2SO_4$, filtered, and the organic solvent is evaporated in a vacuum. The product obtained is in the form of a yellow liquid (i.e., 45% yield).

Example 2

This example shows the preparation of a copolymer according to the invention according to the following reaction scheme:

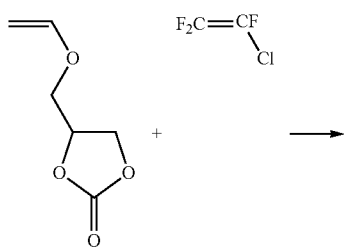

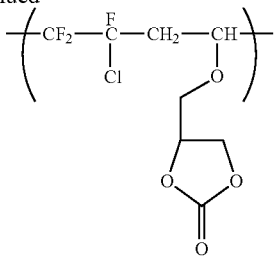

Thus, the monomers used in this example are, respectively:
chlorotrifluoroethylene with the following formula:

referred to below as CTFE; and
(2-oxo-1,3-dioxolan-4-yl)methylvinylether with the following formula:

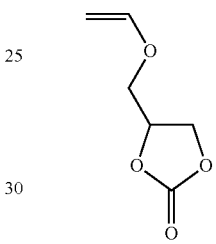

prepared according to example 1 above.

The CTFE is in gaseous form, necessitating the use of an autoclave to implement this step.

The autoclave is equipped with a mechanical agitator with two valves (an gas inlet and outlet valve), with a rupture disk and a precision manometer.

Initially, $K_2CO_3$ is introduced into the autoclave as a powder (161 mg, 1.16 mmol), and the autoclave is then pressurised (30 bar). Once the nitrogen has been evacuated, the reactor is placed under vacuum for approximately 30 minutes, and the CTFE (13.5 g, 0.116 mol), the tert-butyl peroxypivalate (1.80 g, 7.76 mmol) (at a ratio of 5 mol. % compared to the monomers as a whole), 1,1,1,3,3-pentafluorobutane (50 mL), and (2-oxo-1,3-dioxolan-4-yl)methylvinyl ether prepared previously (5.6 g; 0.0338 mol) are introduced.

The autoclave is then agitated and progressively heated up to 74° C. for approximately 14 hours. The product of this reaction is then precipitated in methanol and placed under vacuum at 50° C. for drying, by which means a white powder results from the drying.

The yield of the reaction is 85%.

The average molar mass in numbers and the polymolecularity index, both evaluated by gaseous phase chromatography with polystyrene standards were respectively estimated at 4200 g·mol$^{-1}$ and 1.90.

The copolymer obtained was also analysed by $^1$H NMR and $^{19}$F NMR.

The $^1$H NMR analysis shows the absence of signals centred at 6.4, 4.8, and 4.05 ppm, characteristics of ethylenic protons of (2-oxo-1,3-dioxolan-4-yl)methylvinylether, showing the incorporation of this monomer into the copolymer.

The signals of the protons of the —CF—CH$_2$— and —CH— groups of the main chain appear respectively at 2.51 and 3.29 ppm and 4.75 and 4.90 ppm.

The signals of the protons of the —O—CH$_2$— groups adjacent to the main chain appear respectively at 4.07 and 4.26 ppm.

The $^{19}$F analysis shows the presence of signals at −107.24 and −117.77 ppm, attributable to the —CF$_2$— groups at −133.60 ppm, attributable to the —CF— groups.

The $^{19}$F NMR spectrum shows the absence of signals of —CF$_2$— groups of the —CF$_2$—CFCl—CF$_2$—CFCl— dyad, showing that the copolymers obtained are alternating copolymers.

Example 3

This example shows the preparation of a copolymer according to the invention according to the following reaction scheme:

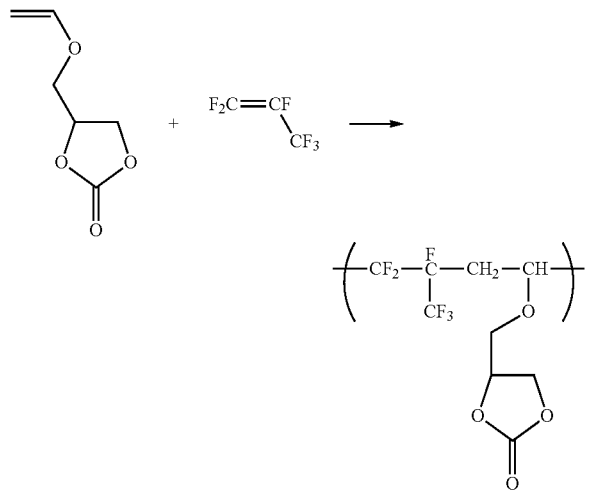

Thus, the monomers used in this example are, respectively:
hexafluoropropene with the following formula:

CF$_2$=CFCF$_3$ referred to below as HFP; and
(2-oxo-1,3-dioxolan-4-yl)methylvinylether with the following formula:

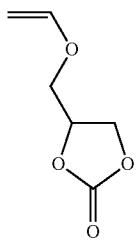

prepared according to example 1 above.

The copolymerisation takes place in an autoclave.

The autoclave is equipped with a mechanical agitator with two valves (an gas inlet and outlet valve), with a rupture disk and a precision manometer.

Initially, K$_2$CO$_3$ is introduced into the autoclave as a powder (138 mg, 1 mmol), and the autoclave is then pressurised (30 bar of nitrogen). Once the nitrogen has been evacuated, the reactor is placed under vacuum for approximately 30 minutes, and the HFP (15 g, 0.1 mol), the tert-butyl peroxypivalate (1.54 g, 6.66 mmol) (at a ratio of 5 mol. % compared to the monomers as a whole), 1,1,1,3,3-pentafluorobutane (50 mL), and (2-oxo-1,3-dioxolan-4-yl) methylvinyl ether (4.8 g; 0.033 mol) are introduced.

The autoclave is then agitated and progressively heated up to 74° C. for approximately 14 hours. The product of this reaction is then precipitated in methanol and placed under vacuum at 50° C. for drying, by which means a white powder results from the drying.

The yield of the reaction is 73%.

The average molar mass in numbers and the polymolecularity index, both evaluated by gaseous phase chromatography with polystyrene standards were respectively estimated at 4600 g·mol$^{-1}$ and 1.27.

The copolymer obtained was also analysed by $^1$H NMR and $^{19}$F NMR.

The $^1$H NMR analysis shows the absence of signals centred at 6.4, 4.8, and 4.05 ppm, characteristics of ethylenic protons of (2-oxo-1,3-dioxolan-4-yl)methylvinylether, showing the incorporation of this monomer into the copolymer.

The signals of the protons of the —CF—CH$_2$— and —CH— groups of the main chain appear respectively at 2.48 and 3.11 ppm and 4.52 ppm.

The signals of the protons of the —O—CH$_2$— groups adjacent to the main chain appear respectively at 3.94 and 4.19 ppm.

The $^{19}$F analysis shows the presence of signals at −107.27 and −120.85 ppm, attributable to the —CF$_2$— groups, at −182.16 ppm, attributable to the —CF— groups and at −74.94 ppm on the —CF$_3$ groups.

The $^{19}$F NMR spectrum shows the absence of signals of —CF$_2$— groups of the —CF$_2$—CF(CF$_3$)—CF$_2$—CF(CF$_3$)— dyad, showing that the copolymers obtained are alternating copolymers.

Example 4

This example shows the preparation of a copolymer according to the invention according to the following reaction scheme:

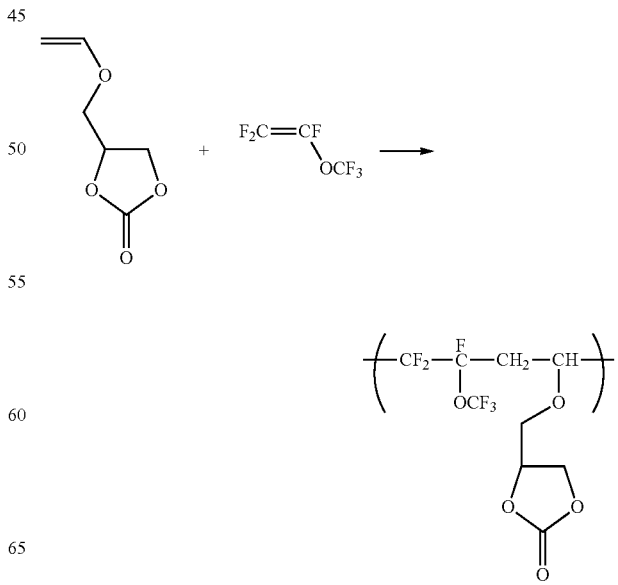

Thus, the monomers used in this example are, respectively:
perfluoromethylvinylether with the following formula:

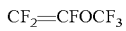

referred to below as PMVE; and
(2-oxo-1,3-dioxolan-4-yl)methylvinylether with the following formula:

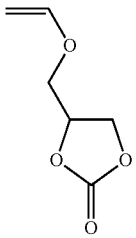

prepared according to example 1 above.

The copolymerisation takes place in an autoclave.

The autoclave is equipped with a mechanical agitator with two valves (an gas inlet and outlet valve), with a rupture disk and a precision manometer.

Initially, $K_2CO_3$ is introduced into the autoclave as a powder (100 mg, 0.72 mmol), and the autoclave is then pressurised (30 bar). Once the nitrogen has been evacuated, the reactor is placed under vacuum for approximately 30 minutes, and the PMVE (16 g, 0.097 mol), the tert-butyl peroxypivalate (1.41 g, 6.07 mmol) (at a ratio of 5 mol. % compared to the monomers as a whole), 1,1,1,3,3-pentafluorobutane (50 mL), and (2-oxo-1,3-dioxolan-4-yl)methylvinyl ether (3.5 g; 0.0243 mol) are introduced.

The autoclave is then agitated and progressively heated up to 74° C. for approximately 14 hours. The product of this reaction is then precipitated in methanol and placed under vacuum at 50° C. for drying, by which means a white powder results from the drying.

The yield of the reaction is 77%.

The average molar mass in numbers and the polymolecularity index, both evaluated by gaseous phase chromatography with polystyrene standards were respectively estimated at 3900 g·mol$^{-1}$ and 1.85.

The copolymer obtained was also analysed by $^1$H NMR and $^{19}$F NMR.

The $^1$H NMR analysis shows the absence of signals centred at 6.4, 4.8, and 4.05 ppm, characteristics of ethylenic protons of (2-oxo-1,3-dioxolan-4-yl)methylvinylether, showing the incorporation of this monomer into the copolymer.

The signals of the protons of the —CF—CH$_2$— and —CH— groups of the main chain appear respectively at 2.65 and 3.08 ppm and 4.57 ppm.

The signals of the protons of the —O—CH$_2$— groups adjacent to the main chain appear respectively at 3.99 and 4.22 ppm.

The $^{19}$F analysis shows the presence of signals at −113.51 and −128.29 ppm, attributable to the —CF$_2$— groups at −135 and −146.92 ppm, attributable to the —CF— groups and at −53.01 ppm on the —CF$_3$ groups.

The $^{19}$F NMR spectrum shows the absence of signals of —CF$_2$— groups of the —CF$_2$—CF(OCF$_3$)—CF$_2$—CF (OCF$_3$)— dyad, showing that the copolymers obtained are alternating copolymers.

The invention claimed is:

1. A copolymer capable of forming a lithium ion-conducting electrolyte comprising at least one repetitive unit having the following formula (I):

wherein:

$R^1$, $R^2$, $R^3$, and $R^4$ represent, independently of one another, a hydrogen atom, a halogen atom, a perfluoroalkyl group or a perfluoroalkoxy group, provided that at least one of the $R^1$-$R^4$ groups represents a halogen atom, a perfluoroalkyl group, or a perfluoroalkoxy group, and at least one repetitive unit having the following formula (II):

wherein:

$R^5$, $R^6$, $R^7$ represent, independently of one another, a hydrogen atom, or an alkyl group;

Z is a single bond or an alkylene group;

X is an alkylene group or a perfluoroalkylene group; and $R^8$ is a cyclic carbonate group, wherein the copolymer comprises 40-95 mol. % of the repetitive unit of formula (I) and 5-60 mol. % of the repetitive unit of formula (II), based on the total moles of the repetitive unit of formula (I) and the repetitive unit of formula (II).

2. The copolymer according to claim 1, wherein, with regard to the repetitive unit of formula (I), at least two of the groups $R^1$-$R^4$ represent fluorine atoms.

3. The copolymer according to claim 1, wherein $R^1$-$R^4$ represent fluorine atoms.

4. The copolymer according to claim 1, wherein, with regard to the repetitive unit of formula (I), three of the $R^1$-$R^4$ represent a fluorine atom, and the fourth group represents a hydrogen atom, a halogen atom other than fluorine, a perfluoroalkyl group, or a perfluoroalkoxy group.

5. The copolymer according to claim 4, wherein, with regard to the repetitive unit of formula (I), $R^1$-$R^3$ represent a fluorine atom, and $R^4$ represents a hydrogen atom, a chlorine atom, a perfluoromethyl group, a perfluoromethoxy group, a perfluoroethoxy group, or a perfluoropropoxy group.

6. The copolymer according to claim 1, wherein Z is a single bond, such that the repetitive unit of formula (II) corresponds to formula (VI) below:

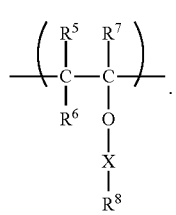
(VI)

7. The copolymer according to claim 6, wherein, with regard to the repetitive unit of formula (II), $R^5$-$R^7$ represent a hydrogen atom, and X is an alkylene group.

8. The copolymer according to claim 6, comprising a repetitive unit corresponding to one of formulae (VIII) or (IX) below as a repetitive unit of formula (II):

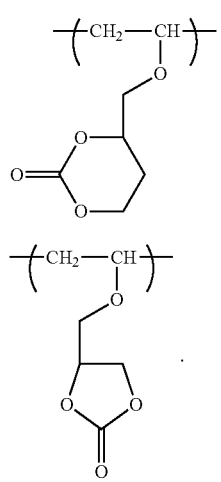
(VIII)

(IX)

9. The copolymer according to claim 6, comprising, as a repetitive unit of formula (I), at least one repetitive unit having formula (V) below:

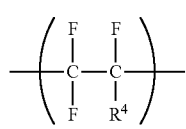
(V)

wherein $R^4$ represents a chlorine atom, a perfluoromethyl group, or a perfluoromethoxy group, and
at least one repetitive unit of formula (IX) below as a repetitive unit of formula (II):

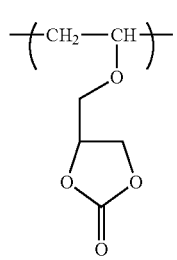
(IX)

10. The copolymer according to claim 6, wherein $R^8$ corresponds to one of formulae (III) or (IV) below:

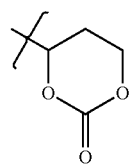
(III)

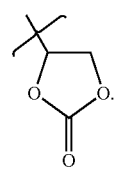
(IV)

11. The copolymer according to claim 1, in which $R^8$ corresponds to one of formulae (III) or (IV) below:

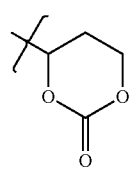
(III)

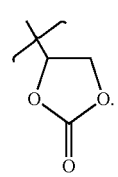
(IV)

12. The copolymer according to claim 1, which is an alternating copolymer.

13. A method for preparing a copolymer capable of forming a lithium ion-conducting electrolyte comprising at least one repetitive unit having the following formula (I):

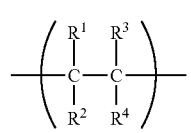
(I)

wherein:
$R^1$, $R^2$, $R^3$, and $R^4$ represent, independently of one another, a hydrogen atom, a halogen atom, a perfluoroalkyl group or a perfluoroalkoxy group, provided that at least one of the $R^1$-$R^4$ groups represents a halogen atom, a perfluoroalkyl group, or a perfluoroalkoxy group,
and at least one repetitive unit having the following formula (II)

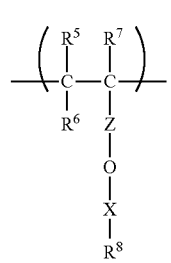
(II)

wherein:

$R^5$, $R^6$, $R^7$ represent, independently of one another, a hydrogen atom, or an alkyl group;

Z is a single bond or an alkylene group;

X is an alkylene or perfluoroalkylene group; and $R^8$ is a cyclic carbonate group, wherein the copolymer comprises 40-95 mol. % of the repetitive unit of formula (I) and 5-60 mol. % of the repetitive unit of formula (II), based on the total moles of the repetitive unit of formula (I) and the repetitive unit of formula (II);

said process comprising a radical polymerization method comprising polymerization in the presence of a free radical initiator and at least one monomer of formula (X) below:

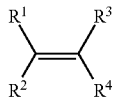
(X)

and at least one monomer of formula (XI) below:

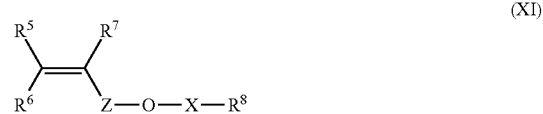
(XI)

in which $R^1$, $R^2$, $R^3$, $R^4$, $R^5$, $R^6$, $R^7$, $R^8$, X, and Z are as defined above.

14. A membrane comprising at least one copolymer as defined in claim 1.

15. A lithium generator comprising at least one electrochemical cell, each of the at least one electrochemical cell comprising at least one membrane as defined in claim 14, arranged between a positive and negative electrode.

* * * * *